No. 859,250. PATENTED JULY 9, 1907.
W. C. RANDS.
CONCEALED FITTING FOR MOUNTING VEHICLE TOPS.
APPLICATION FILED JUNE 21, 1906.

2 SHEETS—SHEET 1.

Witnesses:
O. B. Baenziger
G. G. Howlett

Inventor:
William C. Rands.
By T. A. Wheeler & Co. Attys.

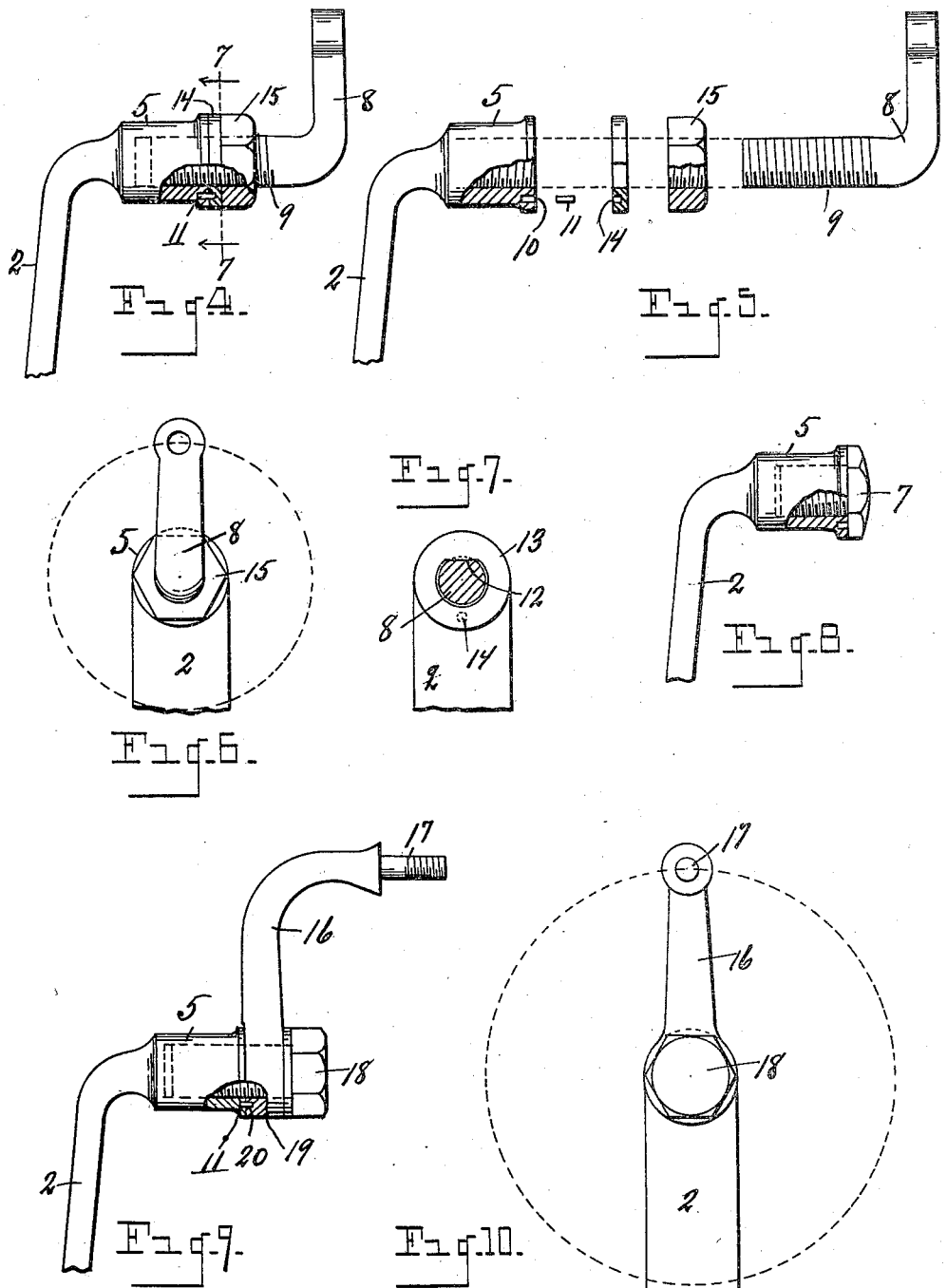

UNITED STATES PATENT OFFICE.

WILLIAM C. RANDS, OF DETROIT, MICHIGAN.

CONCEALED FITTING FOR MOUNTING VEHICLE-TOPS.

No. 859,250.

Specification of Letters Patent.

Patented July 9, 1907.

Application filed June 21, 1906. Serial No. 322,677.

*To all whom it may concern:*

Be it known that I, WILLIAM C. RANDS, a citizen of the United States, residing at Detroit, in the county of Wayne, State of Michigan, have invented certain new and useful Improvements in Concealed Fittings for Mounting Vehicle-Tops; and I do declare the following to be a full, clear, and exact description of the invention, such as will enable others skilled in the art to which it appertains to make and use the same, reference being had to the accompanying drawings, and to the figures of reference marked thereon, which form a part of this specification.

This invention relates to concealed fittings for mounting vehicle tops, especially designed for supporting the tops of automobiles of whatever character, and consists in the construction and arrangement of parts hereinafter fully set forth and pointed out particularly in the claims.

The object of the invention is to provide simple and efficient fittings for supporting the tops of vehicle bodies, wherein the arrangement is such as to practically conceal said fittings when not in use for supporting a top, provision being made for quickly and securely mounting and maintaining the top in position, when desired, the arrangement being such that when the top is removed, no parts of the fittings unduly project beyond the plane of the body frame or upholstery. The above object is attained by the structure illustrated in the accompanying drawings, in which:—

Figure 1:
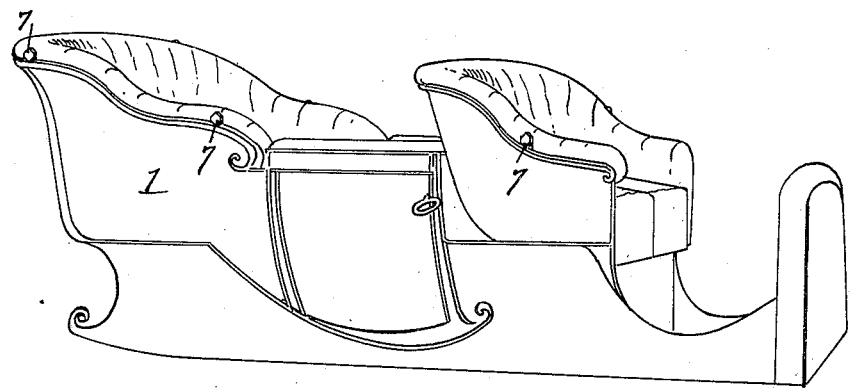
Figure 2:
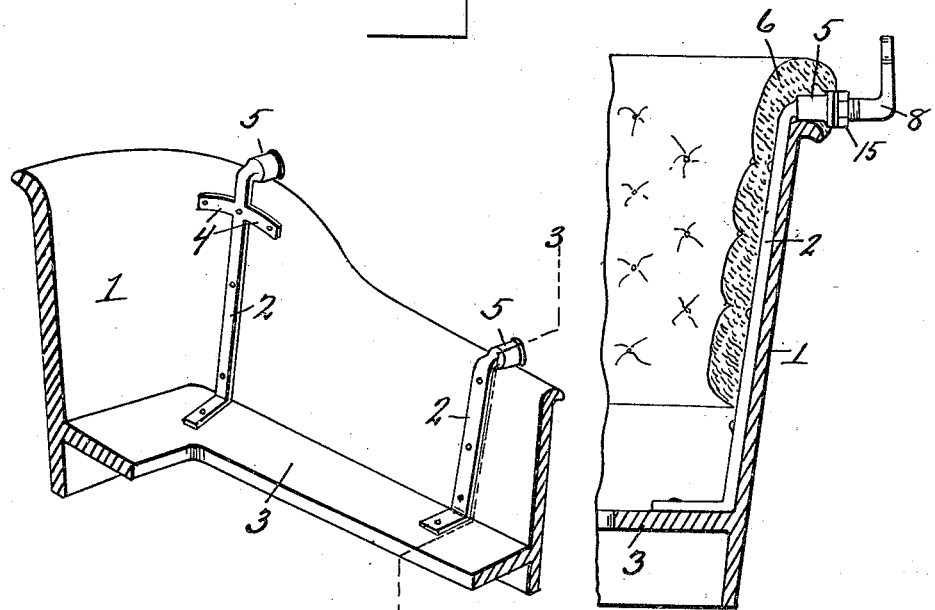
Figure 3:
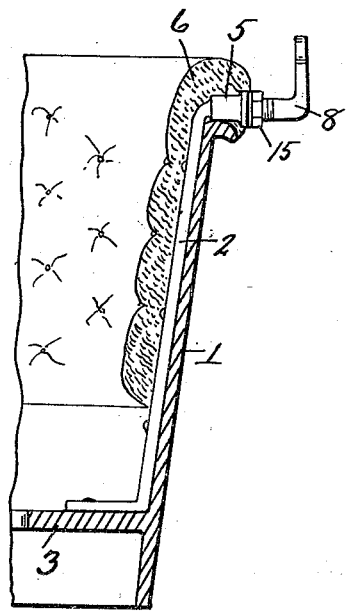

Figure 1 is a perspective view of a vehicle body provided with my improved fittings, showing the caps covering the socket openings in which may be secured the parts that support the top. Fig. 2 is a fragmentary view in perspective, of a portion of a vehicle body, showing the body irons which carry the socket members securely attached to the body. Fig. 3 is an enlarged sectional view as on line 3—3 of Fig. 2, showing in addition the upholstery and a top-supporting member secured in the socket of the fitting. Fig. 4 is an elevation with parts broken away, showing a top-supporting member or bracket screwed into the socket of the fitting, and a jam nut for securing said parts in place, a D-washer being pinned to the socket member to prevent the bracket member turning. Fig. 5 is a view of the parts shown in Fig. 4 disassembled and partly sectioned. Fig. 6 is an end elevation of Fig. 4. Fig. 7 is a transverse section as on line 7—7 of Fig. 4. Fig. 8 is an elevation of a portion of a body iron and a socket member, said member being partly in section and a capped plug being screwed therein. Fig. 9 is an elevation, parts broken away, showing the means for securing to the socket member a bracket of a different type from that shown in Fig. 4. Fig. 10 is an end elevation of Fig. 9.

Referring to the characters of reference, 1 designates the vehicle body which is strengthened by the body irons 2 that are secured to the sides and extend onto the seat portion 3 in a manner well understood in the art. If desired, the irons may be additionally braced by the laterally extending arms 4. Formed integrally with the body irons at their upper ends are the socket members 5 which project outwardly nearly at right angles to said irons and are tapped as shown. The position of the parts is such that when the body is upholstered, the socket member 5 will lie concealed within the upholstery 6 as clearly shown in Fig. 3, so that when the brackets or fittings that are employed to support the top, are removed, there will be nothing visible but the socket opening which is closed by means of a screw plug having a finished cap 7. When said plug is screwed into the socket, the cap only thereof is visible, as shown in Figs. 1 and 8, affording an ornamental trimming for the body and obviating the unsightly projecting parts which support the top, as is incident to fittings of this character, wherein said supporting parts are formed integral with or non-detachable from the body irons or socket member. By providing the upper ends of the body irons with the tapped socket members 5, provision is made for securing any character of fitting which may be necessary in view of the style of top with which the vehicle may be equipped.

Where an L-shaped bracket 8 is employed, as shown in Figs. 4 to 6 inclusive, the stem of said bracket is threaded as shown at 9, and is screwed into the socket member. To prevent the turning of said bracket after being properly adjusted, there is formed in the margin of the socket member, an aperture 10 adapted to receive a locking pin 11. The upper side of the stem 9 is flattened, as shown at 12, and a D-washer 13 is used thereon, which is provided with an aperture 14 which registers with aperture 10 in the socket member. Upon the threaded stem of the bracket 8 is a jam nut 15. After said stem shall have been screwed into the socket the desired distance, the pin 11 is placed in the aperture 10 of the socket, and the D-washer is placed against the end of the socket so that its aperture 14 will receive the projecting end of said pin, the straight portion of the washer opening engaging the flat portion of said stem; the jam nut 15 is then screwed forcibly into place against the washer, thereby locking all of the parts and securing the L-bracket firmly in position. By providing a series of apertures in the outer end of the socket member, the bracket may be swung to and locked in any desired position.

When employing the goose neck type of bracket 16, as shown in Fig. 9, which is provided at one end with a reduced threaded portion 17 that receives the eye of the bow-sockets of the top, not shown, a bolt 18 is employed which is adapted to pass through the eye 19 in said bracket and screw into the socket member 5, there being in the margin of said eye 19 an aperture 20 which receives the locking pin 11 that extends between the socket member and said bracket to prevent the turning of the bracket on the bolt. When the bolt 18 is screwed tightly into place, the parts are held rigidly in position. The bracket 16 is susceptible of the same adjustment as is the L-bracket 8.

I have only shown two types of bracket fittings in illustrating the application of my invention, but it will be understood that other types of fittings may be employed for supporting the top which the peculiar nature or construction of the top may render necessary, without departing from the spirit of my invention.

Having thus fully set forth my invention, what I claim as new and desire to secure by Letters Patent, is:—

1. The combination with a vehicle body, of a socket member attached thereto and concealed within the upholstery, a bracket member adapted to carry the top, said bracket member having an integral threaded stem to screw into said socket, and means for locking said stem in said socket to prevent independent movement of said parts.

2. The combination with a vehicle body, of a body iron secured thereto, a member carried at the upper end of the body iron having a tapped socket, a bracket member adapted for attachment to the frame of the top, having a threaded stem to screw into the socket member, and means for locking said stem to the socket member to prevent independent movement of said parts.

3. The combination with a vehicle body, of a body iron secured thereto, a socket member at the upper end of said iron the socket of said member being internally threaded, a bracket member having a threaded stem to screw into said socket said stem having a flat portion thereon, a D-washer fitted to the flat portion of said stem, and means for locking said washer to the socket member to prevent independent movement of said parts.

4. The combination with a vehicle body, of a body iron secured thereto, a socket member formed integral with the upper end of the body iron projecting at an angle thereform and concealed within the upholstery, a bracket member having a threaded bolt or stem adapted to screw into said socket member and a pin projecting from the socket member for locking the bracket member against turning.

In testimony whereof, I sign this specification in the presence of two witnesses.

WILLIAM C. RANDS.

Witnesses:
E. S. WHEELER,
I. G. HOWLETT.